US012262662B2

(12) United States Patent
Regier et al.

(10) Patent No.: US 12,262,662 B2
(45) Date of Patent: Apr. 1, 2025

(54) TWINE TENSION CONTROL ASSEMBLY

(71) Applicant: AGCO Corporation, Duluth, GA (US)

(72) Inventors: Bernard Dean Regier, Hesston, KS (US); Travis Wade Horchem, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 901 days.

(21) Appl. No.: 17/365,408

(22) Filed: Jul. 1, 2021

(65) Prior Publication Data

US 2022/0000036 A1 Jan. 6, 2022

Related U.S. Application Data

(60) Provisional application No. 63/046,812, filed on Jul. 1, 2020.

(51) Int. Cl.
*A01F 15/14* (2006.01)
*B65B 13/26* (2006.01)
*B65B 27/12* (2006.01)

(52) U.S. Cl.
CPC .......... *A01F 15/148* (2013.01); *A01F 15/145* (2013.01); *B65B 13/26* (2013.01); *B65B 27/12* (2013.01)

(58) Field of Classification Search
CPC ....... A01F 15/148; A01F 15/145; B65B 27/12
See application file for complete search history.

(56) References Cited

U.S. PATENT DOCUMENTS

| 4,196,661 A | 4/1980 | Peterson et al. |
| 8,671,834 B1 | 3/2014 | Rotole et al. |
| 2015/0305247 A1 | 10/2015 | Chaney |

FOREIGN PATENT DOCUMENTS

| DE | 4016964 A1 * | 11/1991 | .............. B65H 63/04 |
| DE | 202016000568 U1 * | 6/2017 | ......... A01F 15/0715 |
| EP | 2 617 670 A2 | 7/2013 | |
| EP | 2737789 A2 * | 6/2014 | ........... A01F 15/148 |
| GB | 2141664 A | 1/1985 | |
| GB | 2321425 A * | 7/1998 | ........... A01F 15/148 |
| WO | 2010/136501 A1 | 12/2010 | |

OTHER PUBLICATIONS

Translation of DE-202016000568 (Year: 2017).*
Translation of DE-4016964 (Year: 1991).*
European Patent Office, Search Report for related European Patent Application No. EP 21 16 5001.5, dated Sep. 14, 2021.
UK Intellectual Property Office, Search Report for related UK Application No. 2010548.2, dated Jan. 11, 2021.

* cited by examiner

*Primary Examiner* — Bobby Yeonjin Kim

(57) ABSTRACT

A baler twine tension control assembly including a displacement detector and elements defining a twine path. The twine path enters and exits the twine tension control assembly and within the twine tension control assembly extends across a first fixed location and a second fixed location as well as across an intermediate displaceable location located between the first fixed location and the second fixed location. The displacement detector is connected to the intermediate displaceable location and generates a signal indicative of the displacement of the displaceable location.

6 Claims, 8 Drawing Sheets

TWINE TENSION CONTROL ASSEMBLY

CROSS-REFERENCE TO RELATED APPLICATIONS

This application claims the benefit of the filing date of U.S. Provisional Patent Application 63/046,812, filed Jul. 1, 2020, the entire disclosure of each of which is incorporated herein by reference.

FIELD OF THE INVENTION

The present invention relates to a baling apparatus, in particular to a baling apparatus for producing square bales, and in particular to a mechanism for preventing an excess of tension in the twine being fed to a knotter assembly when producing square bales. The present invention also relates a baler incorporating a plurality of such mechanisms.

BACKGROUND

Rectangular bales are able to maintain their shape by means of a series of parallel extending twine loops, provided lengthwise around the bales. Current large square balers are equipped with a plurality of pivotally mounted, upwardly biased twine tensioner arms each associated with a plurality of knotter assemblies to maintain proper tension on the twine to ensure each knotter assembly performs properly. The twine is drawn from suitable twine boxes. If the twine tensioner arm fails to maintain proper tension on the twine, the twine can be pulled out of the knotter assembly and a mis-tie occurs. A number of factors affect the tension on the twine. Sometimes twine gets tangled in the twine box which makes it difficult or impossible for the baler to make knots. In extreme situations the tension in the twine is sufficient to cause bending of the baler needles and also to interfere with the other baler components which may become damaged as a result. Once the baler needles become bent, functioning of the knotter mechanism is significantly impaired causing operational downtime of the baler until repairs may be effected.

It is further a problem that an operator of the baler will not know there is a problem until the knot has been missed or damage to baler components has occurred.

It is an advantage of the present invention that it seeks to address these problems.

BRIEF SUMMARY

According to a first aspect of the present invention, a baler twine tension control assembly comprises a displacement detector and elements defining a twine path, the twine path entering and exiting the twine tension control assembly and within the twine tension control assembly extending across a first fixed location and a second fixed location as well as across an intermediate displaceable location located between the first fixed location and the second fixed location, the intermediate displaceable location being displaced about the first fixed location, the displacement detector being connected to the intermediate displaceable location to generate a signal indicative of a displacement of the displaceable location.

Preferably the first location comprises a first roller mounted for rotation about a first fixed axis, the second location comprises a second roller mounted for rotation about a second fixed axis and the intermediate location comprises a third roller mounted for rotation about a displaceable axis.

Preferably the twine tension control assembly further comprises a severing mechanism comprising a knife element displaceable between a first position located away from the twine path and second position located across the twine path, the severing mechanism being actuated upon displacement of the displaceable location to a predetermined position.

This has as an advantage that should the displaceable location be moved to a predetermined position, the predetermined position representing a tension in a strand of twine corresponding to or exceeding a predetermined threshold, the knife element is actuated to cross the twine path thereby cutting the strand of twine and so avoiding damage to the knotter mechanism and its component parts by a tension in the twine exceeding this threshold level.

In the absence of a strand of twine the intermediate displaceable location is biased to an end position and so in the event of severing of the strand of twine the displacement detector will issue a signal indicative of a lack of tension and so indicative of the strand of twine having been cut.

According to a second aspect of the invention, in a combination comprising an agricultural vehicle and a baler towed by the agricultural vehicle, the baler comprising a plurality of knotter assemblies, each knotter assembly having an associated baler twine tension control assembly according to the first aspect of the invention.

Preferably, the combination further comprises a control unit, a memory in communication with the control unit, and a user terminal in communication with the control unit, the control unit being configured to receive the signals issued by each baler twine tension control assembly, to compare the signals against a predetermined set of values stored in the memory to determine whether one of a plurality of predetermined twine tension conditions exists and to generate a terminal signal to the user terminal to cause the user terminal to signal which of the plurality of predetermined twine tension conditions is present and which of the baler twine tension control assemblies caused the signal to be generated.

This has as an advantage that if an inappropriate predetermined twine tension condition is signalled the operator can determine which twine path requires remedial attention.

Preferably the user terminal signals which tension detection apparatus caused the signal to be generated by way of a visual and/or an audible indication.

More preferably an audible indication is only provided in the event that one of a subset of the predetermined twine tension condition is detected, for example a subset corresponding to an undesirable twine tension condition.

This also has as an advantage that in the event of a predetermined twine tension condition being detected requiring remedial action by an operator, the operator is presented with an opportunity to cease operation of the baler before the strand of twine is cut in order to identify and address the problem causing the increased tension in the twine.

Preferably, in the event that a predetermined twine tension condition resulting in a knife element being displaced across the twine path is detected, the control unit also generates a signal to the baler to cause the baler to cease operating.

This has as an advantage that should an operator not be able to take timely action to prevent severing of a strand of twine, the baler does not continue to pick up crop and feed this to the baling chamber.

Preferably, the control unit comprises a processor located on the baler. Alternatively the control unit comprises a processor on the baler in communication with a processor on the agricultural vehicle. Alternatively, the control unit comprises a processor located on the agricultural vehicle.

According to a third aspect of the invention, a computer implemented method comprises the steps of a control unit receiving a plurality of signals, the signals including signals representing a tension in one or more strands of twine, comparing the signals representative of the tension in the one or more strands of twine against a predetermined set of values stored in the memory to determine whether one of a plurality of predetermined twine tension conditions exists, and generating a terminal signal to a user terminal to cause the user terminal to signal the predetermined twine condition and the tension detection apparatus that caused the terminal signal to be generated.

Preferably in the event of one or more predetermined twine tension conditions, the control unit also generates a signal to cause the baler to cease operating.

According to a fourth aspect of the present invention, a computer readable program comprises instructions that cause one or more processors to implement the method of the third aspect of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal and transverse are made with respect to a longitudinal vehicle axis which is parallel to a normal forward direction of travel. References to terms such as horizontal and vertical are made with respect to the apparatus being located on level, non-sloping ground.

Figure 1:
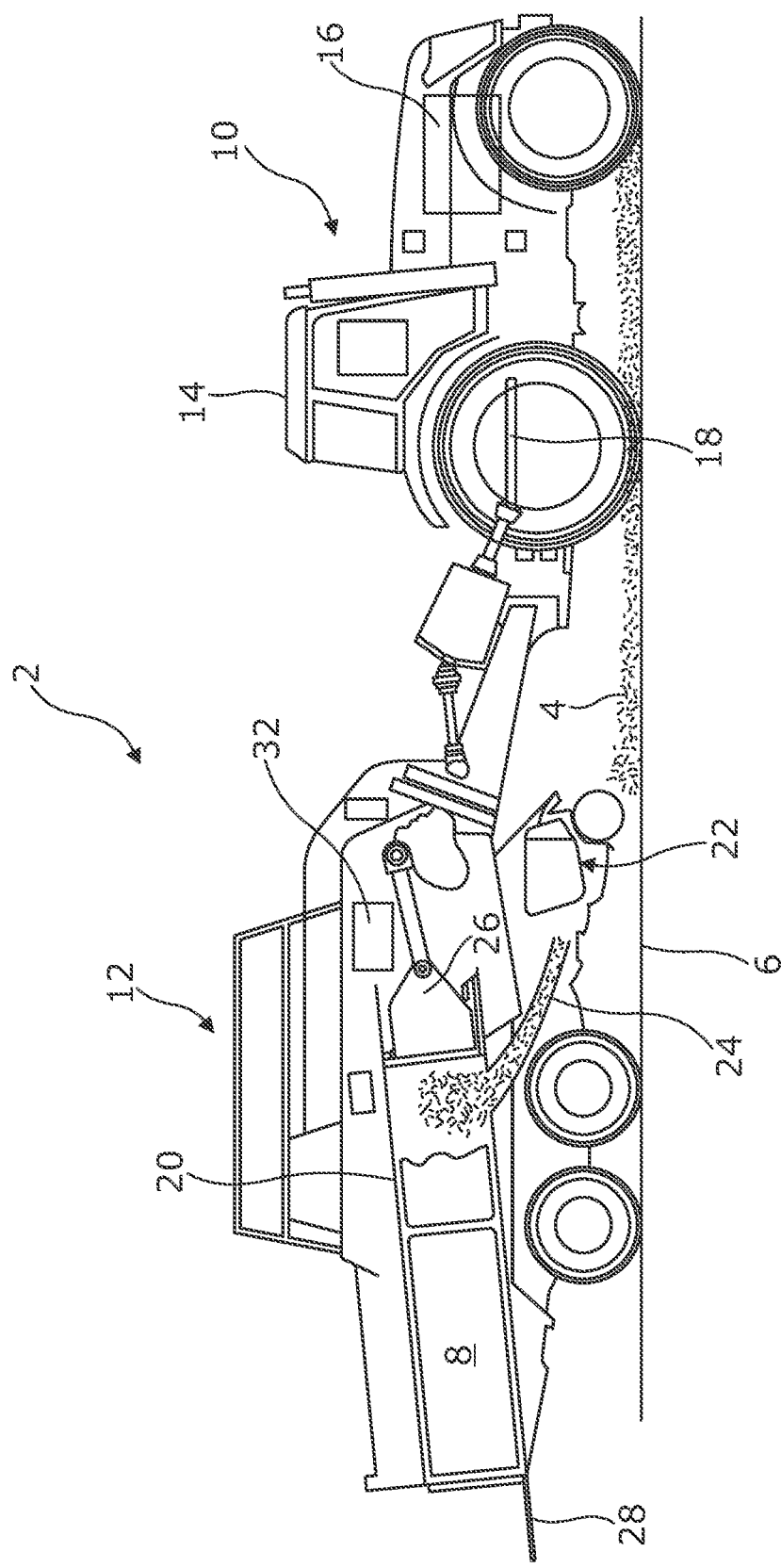
FIG. 1 shows a tractor and baler combination for use with the present invention.
Figure 2:
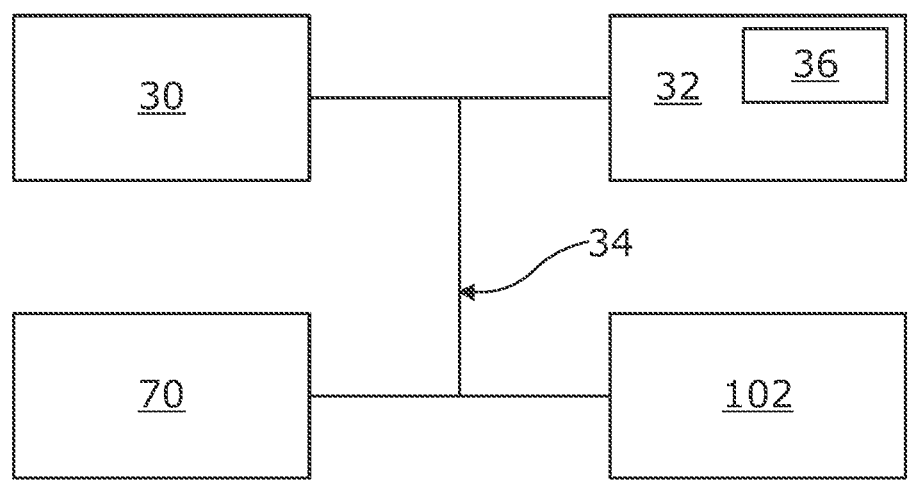
FIG. 2 shows a schematic diagram of baler elements for use with the present invention.

With reference to FIG. 1, a semi-schematic diagram of an agricultural baler system 2 is shown in which the invention may be employed while baling loose crop material 4 from the ground 6 into formed bales 8. The baler system includes a towing vehicle 10 and a baler 12. The towing vehicle 10 may include a cab 14 wherein an operator may be located, an engine 16 operable to move the towing vehicle, and a power take-off (PTO) 18 operable to transfer mechanical power from the engine 16 to the baler 12. The baler 12 is hitched to the towing vehicle in any suitable manner, and power for operating the various mechanisms of the baler 12 may be supplied by the PTO of the towing vehicle 10. One having ordinary skill in the art should appreciate in the context of the present disclosure that the example baler 12 is merely illustrative.

The baler 12 has a baling chamber 20 within which bales of crop material are formed. The baler is depicted as an "in-line" type of baler wherein the loose crop material 4 is picked up by a pickup assembly 22 and then loaded up into the baling chamber 20 by way of a stuffer chute assembly 24 including a charge forming stuffer chamber.

In the illustrated embodiment, the baler 12 is an "extrusion" type baler in which the bale discharge orifice at the rear of the baler 12 is generally smaller than upstream portions of the baling chamber 20 such that the orifice restricts the freedom of movement of a previous charge and provides back pressure against which a reciprocating plunger 26 can act within the baling chamber 20 to compress charges of crop materials to form the next bale. The dimensions of the discharge orifice and the squeeze pressure on the bales at the orifice are controlled by a compression mechanism as is understood by one skilled in the art.

The reciprocating plunger 26 presses newly introduced charges of crop material against a previously formed and tied bale to form a new bale. This action also causes both bales to intermittently advance toward a rear discharge orifice of the baler 12. The completed bales 8 are tied with binding material, for example twine. Once tied, the bales are discharged from the rear end of the bale-forming chamber onto a discharge platform in the form of a chute 28.

A user terminal 30 communicates with an electronic control unit 32. The electronic control unit 32 is also be in electronic or other communication with various components and devices of the baler (and/or the towing vehicle). Conveniently such communication may be enabled by way of a suitable data communication network 34 such as one compliant with the ISOBUS standard (a network in conformance to ISO 11783). For example, the electronic control unit may be in electronic communication with various actuators, sensors, and other devices within (or outside of) the baler. The electronic control unit 32 may communicate with various other components (including other controllers) in various known ways, including wirelessly.

Various alternative locations for the electronic control unit may be utilized, including locations on the towing vehicle. It will be understood that one or more electronic control units may be employed and that the electronic control unit(s) 32 may be mounted at various locations on the towing vehicle, baler, or elsewhere. The electronic control unit(s)

may be a hardware, software, or hardware and software computing device, and may be configured to execute various computational and control functionality with respect to the baler (or towing vehicle).

The electronic control unit 32 is also able to access a suitable memory 36. The memory 36 may take any suitable form and is in electronic communication with the electronic control unit 32. The memory 36 is adapted to store, in any suitable manner such as a database or look up table, reference values for a desired parameter.

The baler 12 is provided with a plurality of knotter assemblies. In use, in order to provide a strand of twine to each knotter assembly, a strand of twine is drawn from a supply roll provided in a twine box located to a side of the baler 12 through a plurality of twine guides provided in a frame of the baler 12 and through a final twine guide associated with a knotter assembly to a tensioner arm of the associated knotter assembly. As is known the baler comprises a plurality of knotter assemblies and some of the knotter assemblies are supplied with strands of twine from supply rolls located to a first side of the baler and the others are supplied with strands of twine from supply rolls located to a second side of the baler.

Each knotter assembly is configured to take strands of twine looped around a formed bale and bind the strands with two knots. During the bale knotting cycle of the baler, needles of each knotter assembly abruptly pull lengths of the twine from at least certain of the supply rolls in order to feed the twine to the knotter assembly. In extreme situations, the twine gets tangled in the twine box and the resulting tension in the strand of twine is sufficient to cause bending of the needles and also to interfere with the other baler components which may become damaged as a result.

By introducing a twine tension control assembly (FIGS. 3 to 8) in the path of each of the strands of twine, this problem can be addressed. While reference is made to a strand of twine, it will be understood that the invention is equally suitable for use with strands of other binding material.

Figure 3:
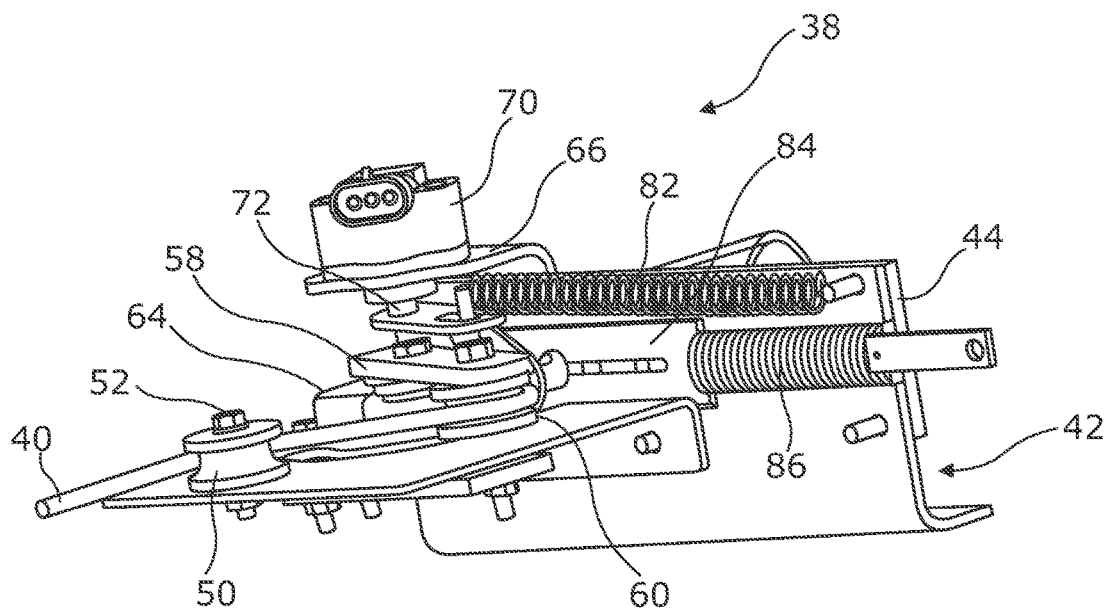
FIG. 3 shows a first perspective view of a twine tension assembly in accordance with the present invention in which the twine is running at an acceptable tension.
Figure 4:
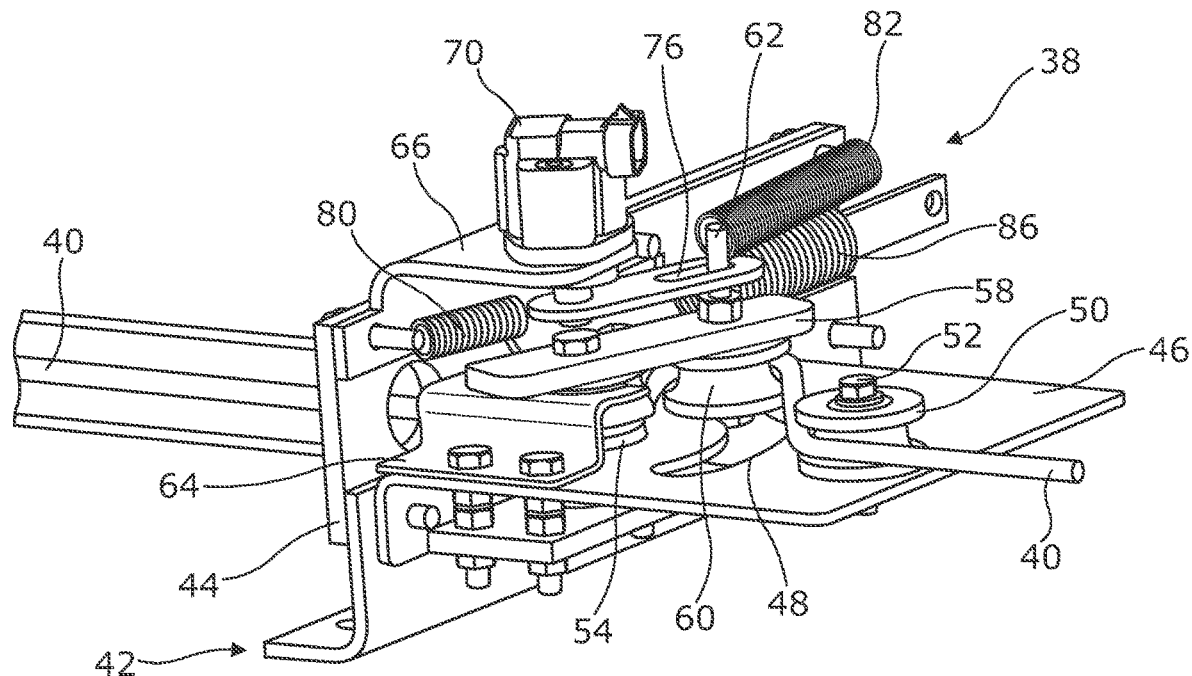
FIG. 4 shows a second perspective view of the twine tension assembly of FIG. 3.

Referring first to FIGS. 3 and 4, an example baler twine tension control assembly 38 is shown in a first position. A strand of twine 40 is shown entering the twine tension control assembly 38 at a first location and exiting the twine tension control assembly 38 at a second location. A twine path is defined between these locations by elements of the twine tension control assembly 38. The twine tension control assembly 38 is mounted to a bracket 42 in turn mounted to the frame of the baler. Alternatively the bracket 42 may form part of the frame of the baler.

The bracket 42 supports a substantially vertical support plate 44 connected to a first side of the bracket and a first L-shaped mounting plate 46 in which a major limb of the mounting plate 46 extends substantially horizontally away from a second side of the bracket 42.

The major limb of the mounting plate 46 includes an arcuate opening 48. A first roller or pulley 50 is mounted on a first shaft 52 for free rotation about the first shaft 52. The first shaft 52 is secured to the major part of the mounting plate 46 on a first side of the arcuate opening 48. A second roller or pulley 54 is mounted on a lower portion of a second shaft 56 for free rotation about the second shaft 56. The second shaft 56 is secured to the major part of the mounting plate 46 on a second side of the arcuate opening 48. A first end of an armature 58 is mounted on an upper portion of the second shaft 56 for free rotation about the second shaft 56. A third pulley or roller 60 is suspended from a second end of the armature 58 for free rotation about a third shaft 62. A depending part of the third shaft 62 extends through the arcuate opening 48.

As can be seen each of the first, second and third pulleys or rollers are aligned with one another. Each of the first, second and third pulleys or rollers 50,54,60 is provided with an arcuate edge for receiving the strand of twine 40 as it passes through the twine tension control assembly 38.

A guide plate 64 comprises a first generally horizontal portion secured to the mounting plate 46, a substantially vertical portion extending upwardly therefrom and a second generally horizontal portion extending from an upper end of the substantially vertical portion. A free end of the second generally horizontal portion is provided with a curved portion. The second generally horizontal portion extends substantially level with an upper part of the second pulley or roller 54. It can be seen that the guide plate 64 serves to guide the strand of twine 40 about the second pulley or roller 54.

In the illustrated embodiment a second bracket 66 is provided connected to an upper part of the support plate. The second bracket 66 is generally linear and is provided at one end with a generally horizontal flange portion sized and shaped to allow a potentiometer 70 to be mounted on it. A rotatable shaft 72 of the potentiometer 70 depends through an opening in the horizontal flange portion and is connected to a first end of a second generally horizontal armature 74. A second end of the horizontal armature 74 is provided with a window 76 extending along a longitudinal axis of the horizontal armature 74. An upper end of the third shaft 62 extends through the window 76. It will be seen that as the third pulley 60 moves the upper end of the third shaft 62 causes the horizontal armature 74 to move, rotating the shaft 72 to cause a signal indicative of the movement to be sent by the potentiometer. It will be understood that the potentiometer may be substituted for other suitable apparatus for converting the angular movement into an electrical signal.

An opening 78 is provided in support plate 44 through which the strand of twine 40 passes. A biased severing mechanism is located adjacent the opening 78.

The severing mechanism comprises a displaceable knife element 84 operating within a channel. The upper and lower edges of the channel are defined by the upper and lower sides of the respective first and second brackets 42,66 (see FIG. 3). Each of the upper and lower edges defines a shoulder separating a broader portion of the channel from a narrower portion of the channel. The support plate 44 defines a side of the channel. The knife element comprises a relatively broad portion having a cutting edge at a free end and a relatively narrower portion joined by a shoulder extending from the other end. A rear edge of the broader portion of the knife element can be seen to abut the shoulder of the channel in the position shown in FIGS. 3 and 4. A biasing member, for example compression spring 86 acts to urge the knife element 84 towards and across the opening 78 in the support plate 44. A first end of the compression spring is secured to a second end of one or both of the first and second brackets 42, 66 or to a second end of the mounting plate 44. A second end of the compressing spring acts against the shoulder of the knife element.

Figure 10:
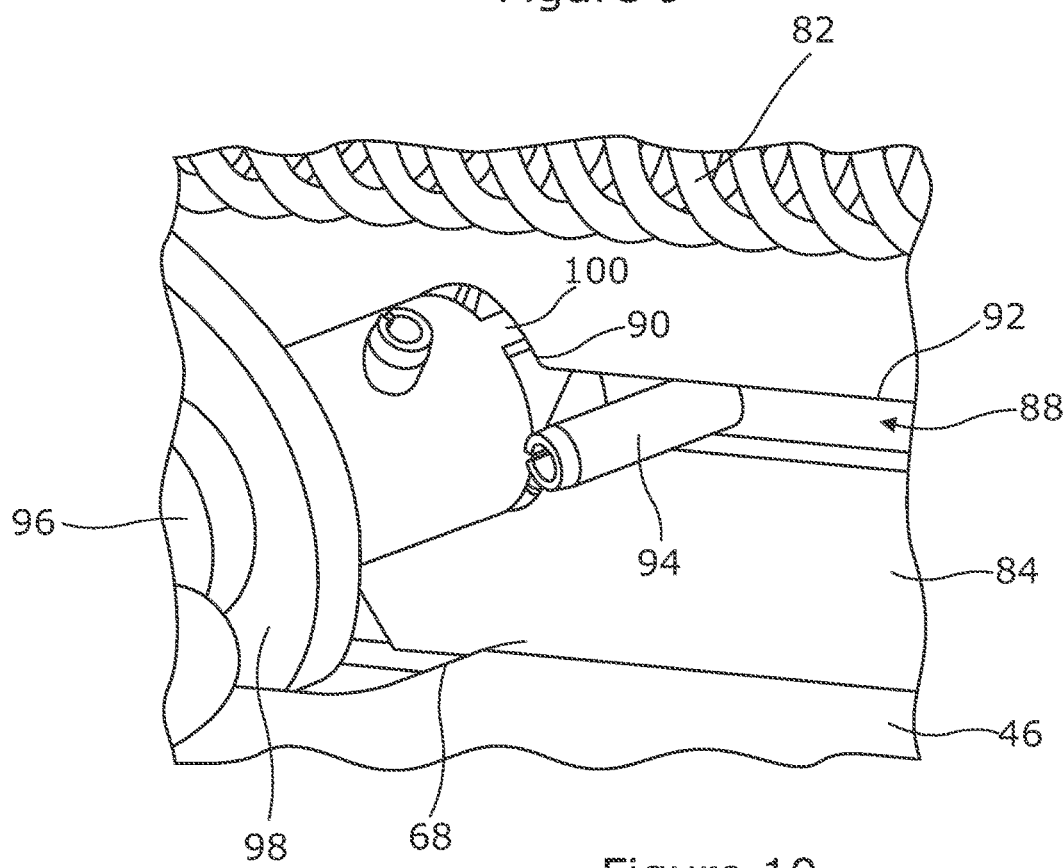
FIG. 10 shows a detail of the severing mechanism in a first position.
Figure 11:
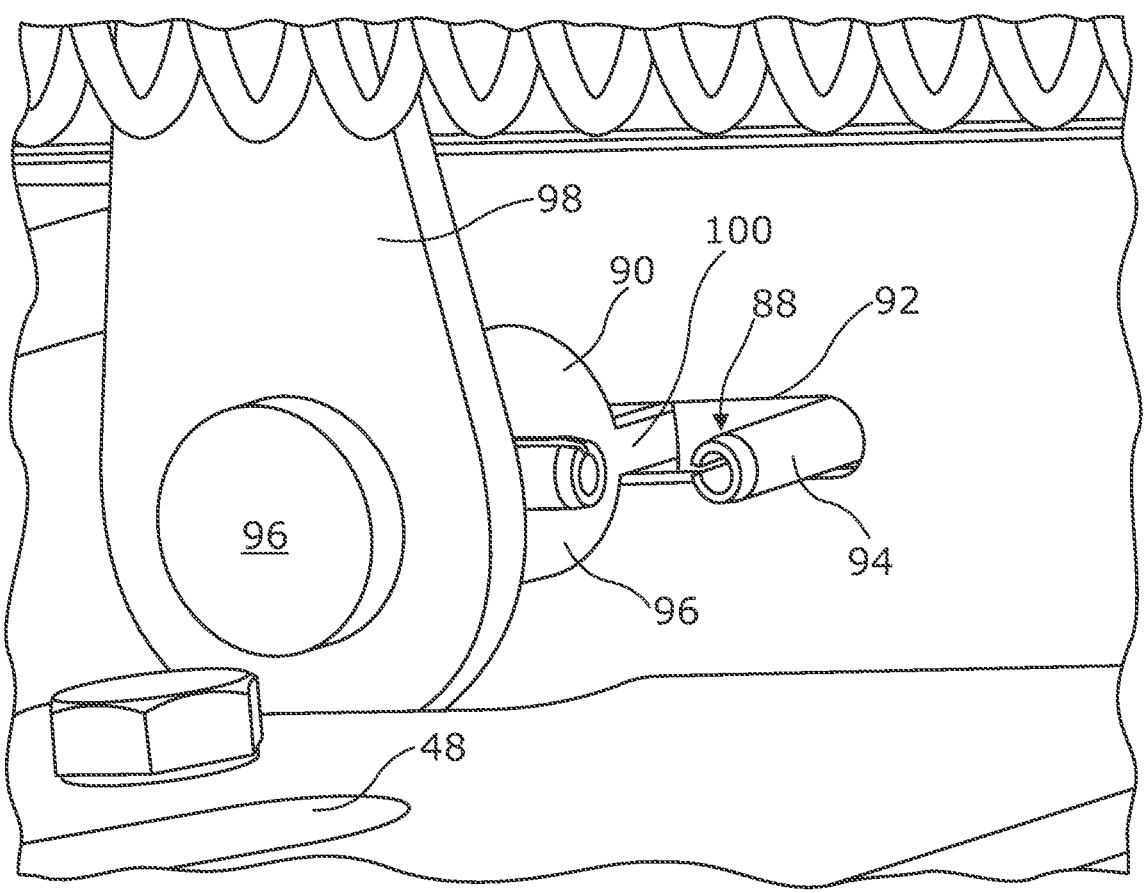
FIG. 11 shows a detail of the severing mechanism in a subsequent position.

The knife element is provided with a keyhole aperture (shown in more detail in FIGS. 5, 10 and 11) comprising a circular opening 90 at one end with an elongate channel 92 extending away from the circular opening along a longitudinal axis of the knife element 84.

A lower minor portion of the mounting plate 46 secured to the support plate 44 serves to hold the broader portion of the knife element 84 within the channel.

A guide pin 94 mounted on the support plate 44 extends through the elongate channel 92 of the keyhole aperture of the knife element 84.

A substantially cylindrical body is mounted for rotational on the support plate 44 and extends across the channel. In the illustrated embodiment it can be seen that a portion of the rotational body 96 extending beyond the channel is fixedly attached to a first end of a lever arm 98. The lever arm 98 extends orthogonally away from the rotational body 96. A cutaway portion 68 is provided in the mounting plate 46 in which the lever arm 98 may freely move (best shown in FIGS. 5, 10 and 11).

The second bracket 66 further includes a first fixing point at a first end adjacent the opening 78 and a second fixing point at a second end. A first biasing element, for example a first helical spring 80, extends between the first fixing point and a free end of the lever arm 98. A second biasing element, for example a second helical spring 82, extends between the second fixing point and the upper end of the third shaft 62.

The first and second biasing elements are chosen to keep the elements of the twine tensioning mechanism in the position shown in FIGS. 3 and 4 when there is no operating tension in the strand of twine (or in the absence of a strand of twine).

Figure 5:
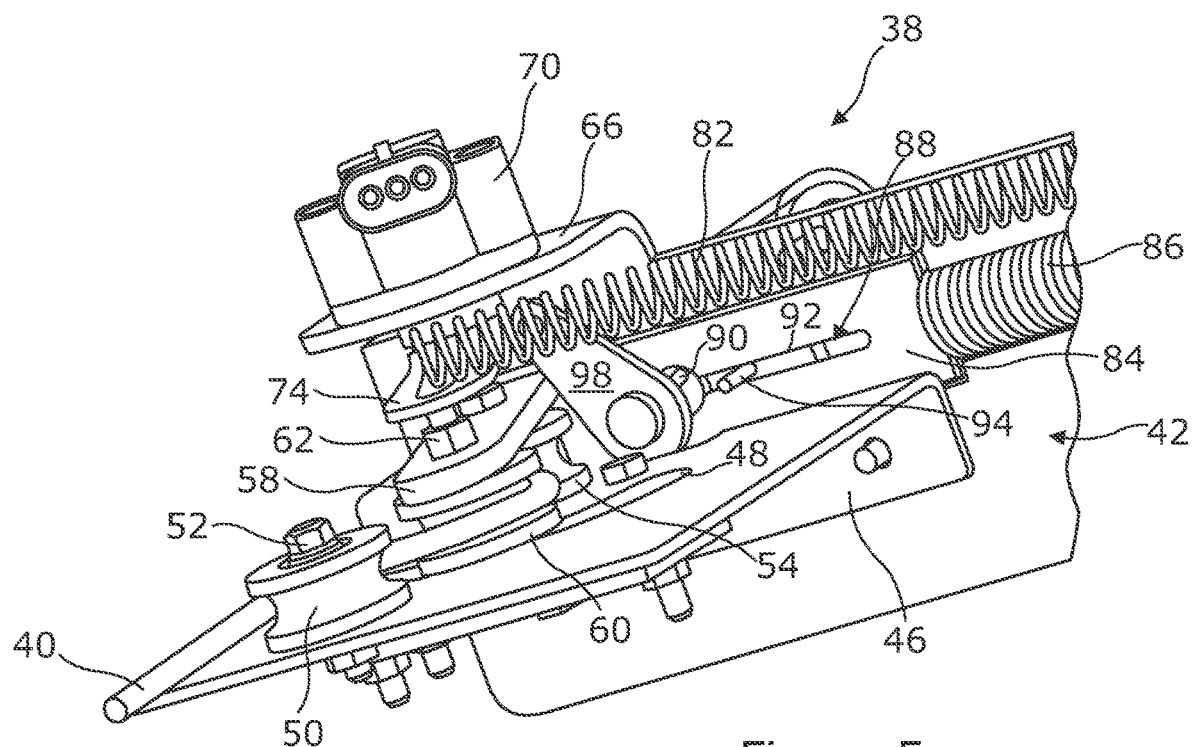
FIG. 5 shows a first perspective view of the twine tension assembly of FIG. 3 in which the twine is running at a high level.

A first edge of the lever arm 98 is contacted by an edge of the armature 58 (cf FIG. 5). Movement of the armature 58 causes movement of the lever arm 98 to rotate the rotational body 96 against the force of the first helical spring 80 (clockwise as shown in the Figures).

The rotational body 96 is also provided with two diametrically opposed cut away portions where the rotational body 98 extends though the knife element 84 and across the channel to form a central linear portion 100 extending across the rotational body 96.

In FIGS. 3 and 4, the central linear portion 100 is located within the circular opening 90 of the keyhole aperture, but is not aligned with the elongate channel 92 of that aperture. As such, the knife element 84 is held by the rotational body 96 against the force of the compression spring 86.

In operation there will typically be some tension in the strand of twine, and from time to time the tension will be raised.

Figure 6:
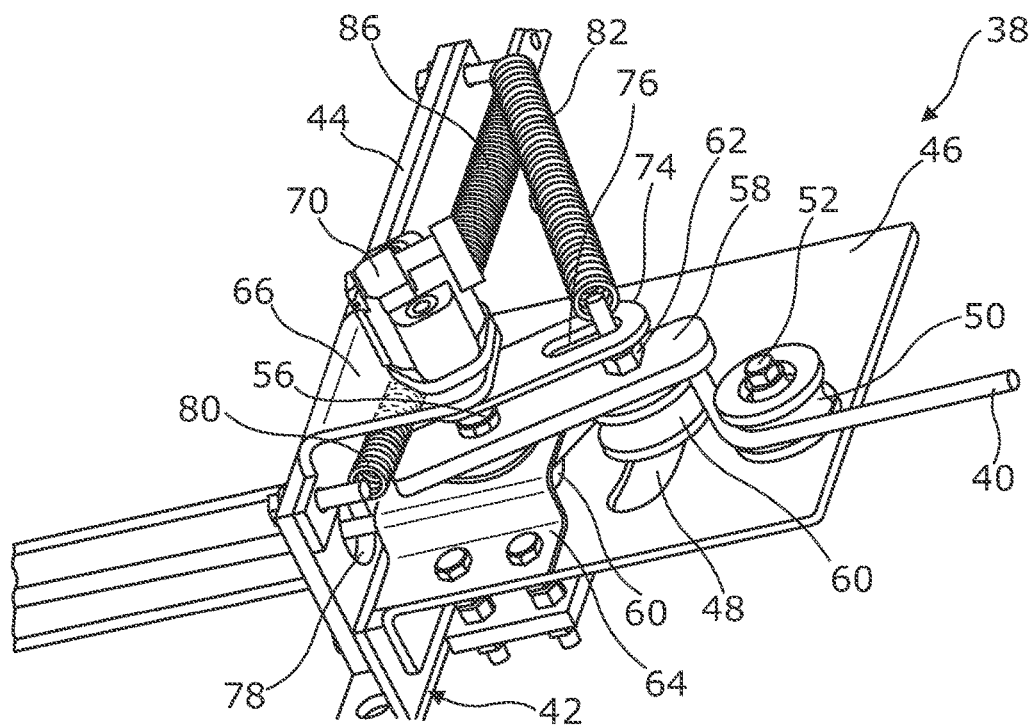
FIG. 6 shows a second perspective view of the twine tension assembly of FIG. 5.

FIGS. 5 and 6 show an elevated level of tension, but not a level such as to cause damage to the needles of the knotter assembly. It can be seen that the tension in the strand of twine has caused the third pulley 60 to be drawn toward the first and second pulleys 50,54 acting against the tension in the second helical spring 82. The corresponding movement of the second end of the armature 58, causes the first end of the armature 58 to push against the lever arm 98 of the rotational body 96 causing the rotational body to rotate clockwise as shown in FIG. 5. Movement of the lower armature 58 in this way also causes the upper armature 74 to be rotated about the potentiometer shaft 72 causing the potentiometer to generate a signal representing the degree of movement of the third pulley 60 and hence the degree of tension in the strand of twine.

The electronic control unit 32 receives the signal from the potentiometer 70. The signal is then compared against reference values stored in the memory 36 to determine a twine tension condition. If the potentiometer signals are determined to represent a tension in excess of a first threshold value, the electronic control unit causes a signal to be sent to the user terminal to signal a warning to the operator.

The warning will alert the operator to an undesirably high level of tension in the twine associated with a particular knotter assembly. The warning may be a visual indicator, an audible indicator or both.

In some circumstances the tension in the twine may exceed a level just below a level likely to lead to damage to the knotter assembly and/or the baler before the operator is able to take action.

Figure 7:
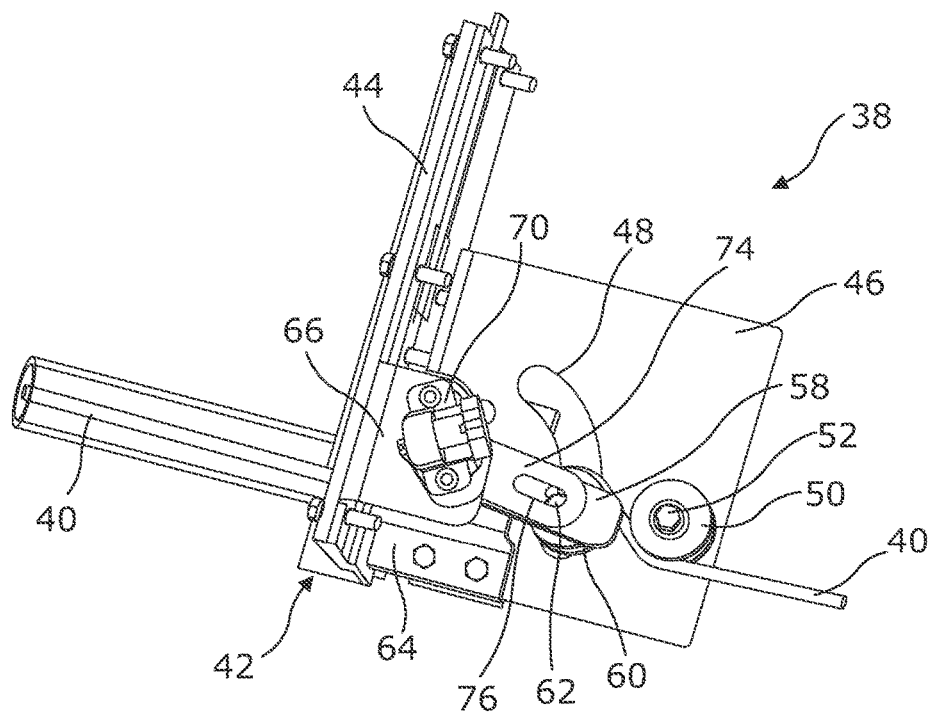
FIG. 7 shows a first perspective view of the twine tension assembly of FIG. 3 in which the severing mechanism has been activated.
Figure 8:
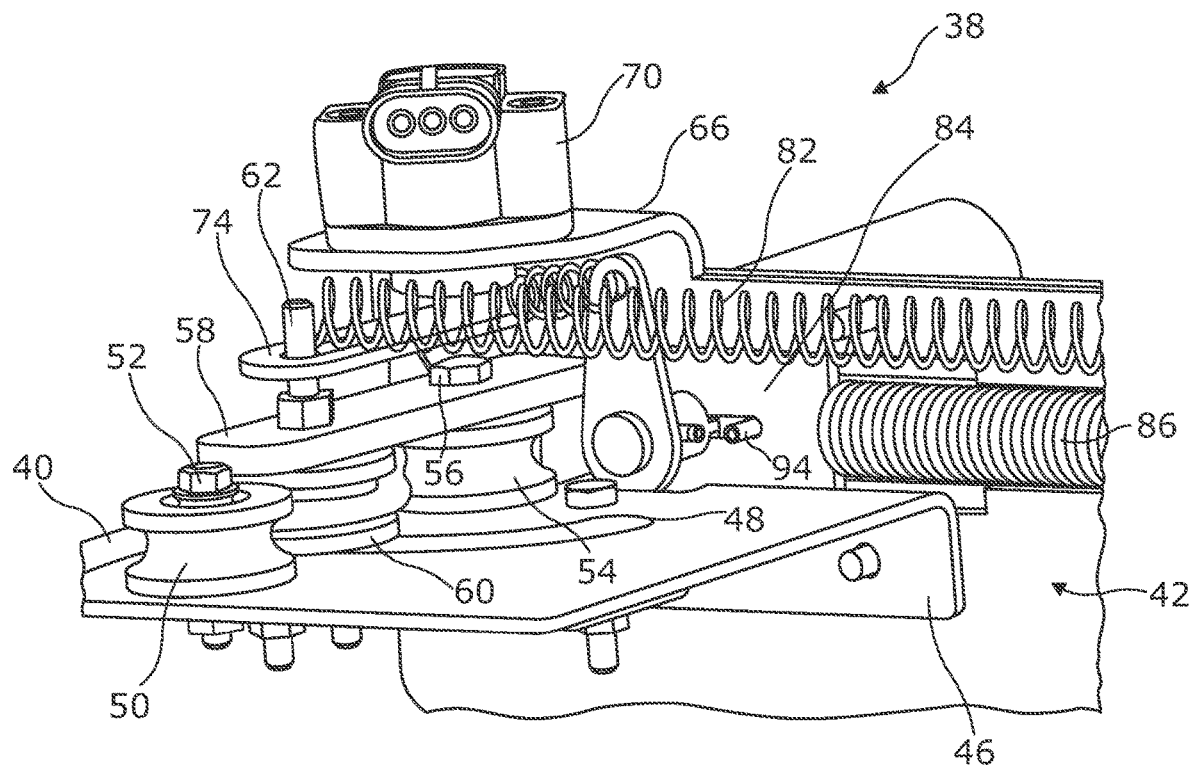
FIG. 8 shows a second perspective view of the twine tension assembly of FIG. 7.
Figure 9:
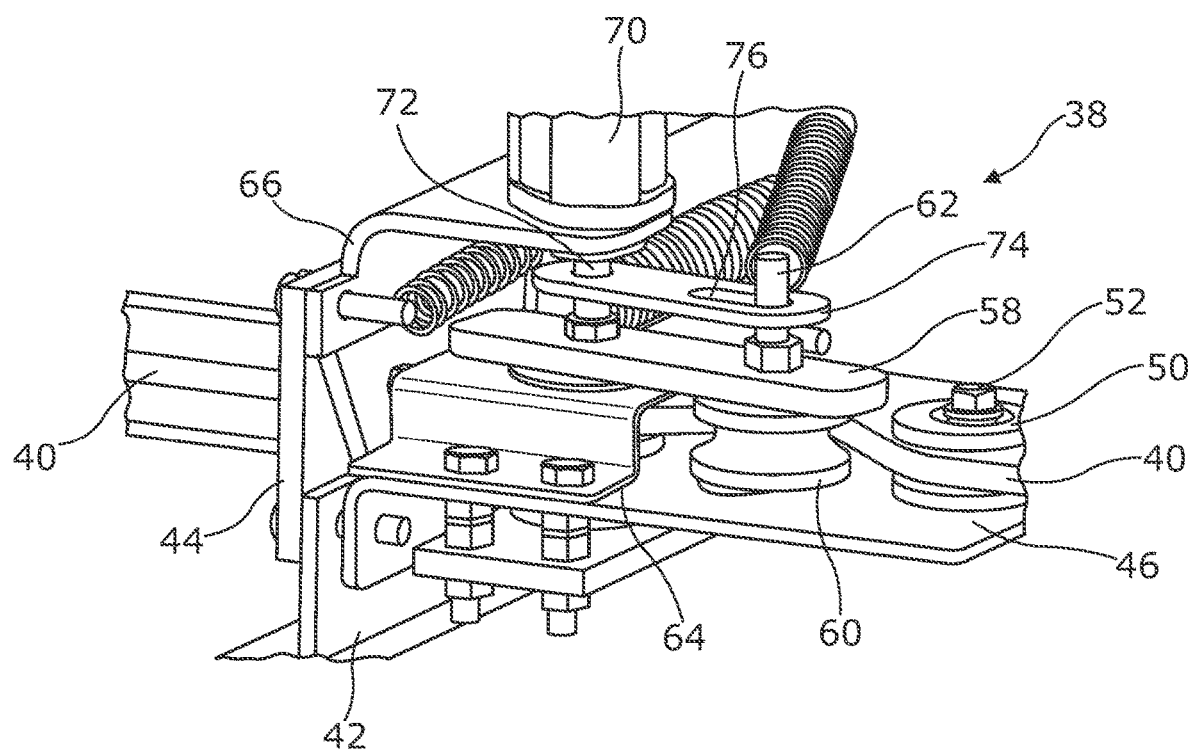
FIG. 9 shows a third perspective view of the twine tension assembly of FIG. 8.

Such a situation is shown in FIGS. 7, 8 and 9. In these Figures it can be seen that the tension has caused the first, second and third pulleys 50,54,60 to become substantially aligned. It will be understood that this position ("a triggering position") is a function of the original positioning of the pulleys 50,54,60 and the selection of the first and second biasing elements. As can best be seen in FIG. 8, movement of the third pulley 60 and so movement of the armature 58 has pushed the lever arm 98 into a substantially vertical position. As may be seen in the detailed view of FIG. 11, the linear portion 100 is now aligned with the elongate channel 92 of the keyhole aperture. Since the rotational body no longer acts against the action of the compression spring 86, the compression spring 86 can now drive the knife element 84 across the opening 78 and the blade of the knife element 84 across the strand of twine 40 to cause the strand of twine 40 to be severed. It will be understood that severing of the strand of twine 40 will automatically relieve the tension in the strand of twine 40 in the region of the knotter assembly thereby preventing damage to the needles or other parts of the baler.

The forward movement of the knife element 84 is stopped by a trailing end of the elongate channel 92 abutting the guide pin 94. The compression spring 86 holds the knife element 84 against the guide pin 94 to maintain the biased cutting element in this position.

Movement of the armatures to the triggering position also causes the potentiometer to generate a signal to the electronic control unit 32. The electronic control unit compares this signal against the reference values stored in the memory. Matching the potentiometer signal with a reference value associated with the triggering position causes the electronic control unit 32 to generate a signal to be sent to the user terminal 30 causing a notification to the operator. The notification will alert the operator to the severing of the twine associated with a particular knotter assembly. The notification may be a visual indicator, an audible indicator or both. The visual signal may, by way of example, take the form of an icon displayed on the user terminal. The audible signal may, by way of example, take the form of a tone or spoken message issuing from the user terminal. The operator can then stop the baler and rethread the twine as required.

In an alternative embodiment, on matching the potentiometer signal with the reference value corresponding to the triggering position, the electronic control unit generates a signal to be sent to the baler to cause the baler to cease operation as well as the signal to the user terminal. For example a signal may be sent to disengage a clutch 102 located between the PTO 18 and the reciprocating plunger 28 thereby preventing further bale formation. This has as an advantage that operation of the baler is stopped as soon as the strand of twine is severed.

Figure 12:
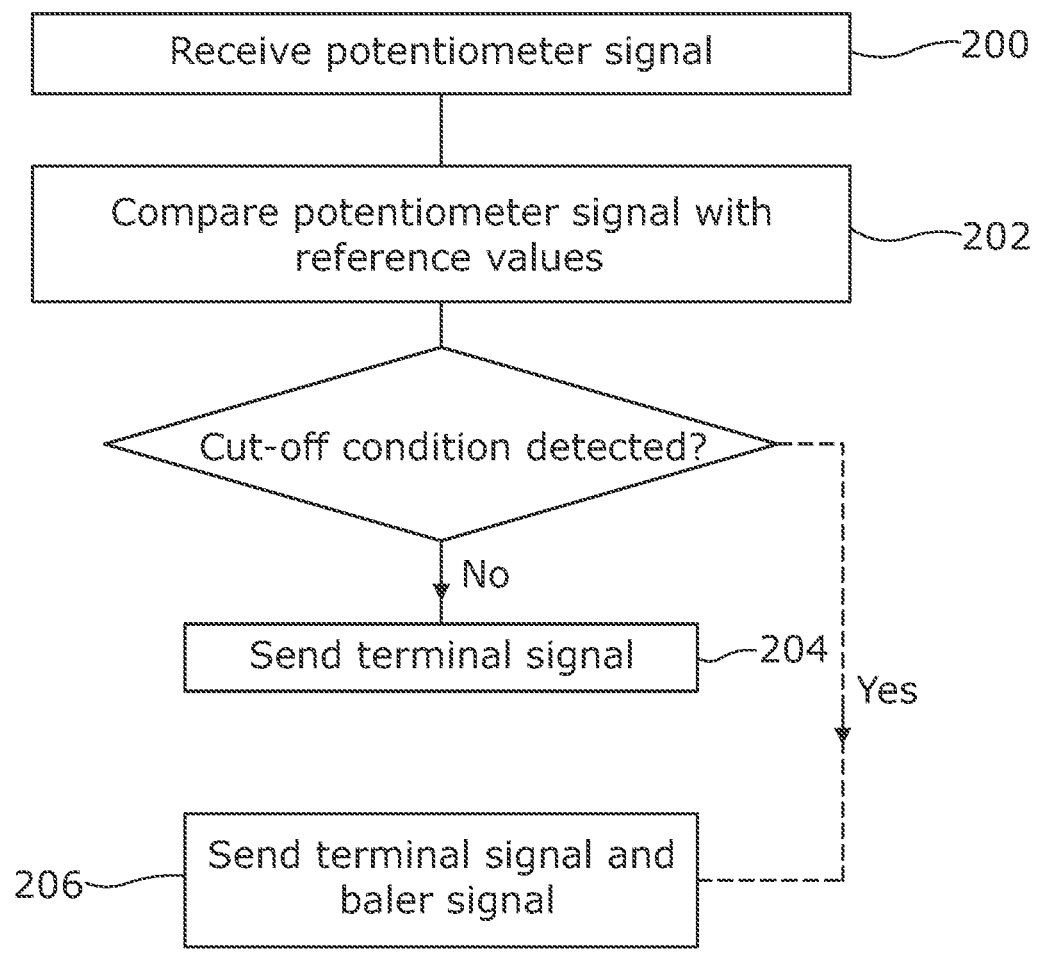
FIG. 12 shows a flow diagram illustrating a method of operation of the twine tension assembly.

It can be seen that the potentiometer will issue signals indicative of the position of the third pulley 60 and so the tension in the strand of twine 40 (step 200, FIG. 12). The signals sent to the controller 30 are compared to reference values corresponding to one of a plurality of predetermined twine tension conditions (step 202) and the terminal signals generated by the control unit as a result (step 204) reflect the situation to be communicated to the operator via the user terminal. Where the twine tension condition corresponds to the triggering position, the control unit 30 also generates the signal (step 206) to the baler to cause the baler to cease operation.

From reading the present disclosure, other modifications will be apparent to persons skilled in the art. Such modifications may involve other features which are already known in the field of square balers and component parts therefore and which may be used instead of or in addition to features already described herein.

The invention claimed is:

1. A combination comprising an agricultural vehicle and a baler towed by the agricultural vehicle, the baler comprising a plurality of knotter assemblies, each knotter assembly having an associated baler twine tension control assembly comprising:
- a displacement detector;
- a first fixed location;
- a second fixed location;
- an intermediate displaceable location located between the first fixed location and the second fixed location and displaceable about the first location, the first fixed location, the second fixed location and the intermediate displaceable location together defining a twine path, the twine path entering and exiting the twine tension control assembly and within the twine tension control assembly, the twine path extending across the first fixed location and the second fixed location as well as across the intermediate displaceable location wherein the displacement detector is connected to the intermediate displaceable location and configured to generate a signal indicative of a displacement of the displaceable location;
- a control unit;
- a memory in communication with the control unit;
- a user terminal in communication with the control unit, the control unit being configured to receive the signals issued by each baler twine tension control assembly, to compare the signals against a predetermined set of values stored in the memory, determine whether one of a plurality of predetermined twine tension conditions exists, and generate a terminal signal to the user terminal to cause the user terminal to signal which of the plurality of predetermined twine tension conditions is present and which of the baler twine tension control assemblies caused the signal to be generated, wherein the user terminal indicates which of the baler twine tension control assemblies generated the terminal signal by either a visual or audible indication or both the visual and audible indications; and
- a severing mechanism comprising a knife element displaceable between a first knife position located away from the twine path and a second knife position located across the twine path, the severing mechanism being actuated upon displacement of the displaceable location to a predetermined position and that in the event that a predetermined twine tension condition resulting in a knife element being displaced across the twine path is determined, the control unit generates and transmits a signal to the baler to cease operating.

2. The combination of claim 1, wherein the first location comprises a first roller mounted for rotation about a first fixed axis, the second location comprises a second roller mounted for rotation about a second fixed axis and the intermediate location comprises a third roller mounted for rotation about a displaceable axis.

3. The combination of claim 1, wherein the audible indication is only provided in the event that one of a subset of the predetermined twine tension conditions is determined.

4. The combination of claim 1, further comprising a control unit comprising a processor located on the baler.

5. The combination of claim 4 wherein the control unit comprises a processor on the baler in communication with a processor on the agricultural vehicle.

6. The combination of claim 1, further comprising a control unit comprising a processor located on the agricultural vehicle.

* * * * *